United States Patent [19]

Fischbeck

[11] 4,379,300
[45] Apr. 5, 1983

[54] INK JET PRINTING
[75] Inventor: Kenneth H. Fischbeck, Dallas, Tex.
[73] Assignee: Xerox Corporation, Stamford, Conn.
[21] Appl. No.: 304,490
[22] Filed: Sep. 22, 1981
[51] Int. Cl.³ .......................................... G01D 15/18
[52] U.S. Cl. ............................... 346/1.1; 346/140 R
[58] Field of Search .................. 346/140 R, 75, 139 R, 346/1.1; 400/126

[56] References Cited

U.S. PATENT DOCUMENTS

| | | | |
|---|---|---|---|
| 3,136,594 | 6/1964 | Ascoli | 346/1.1 |
| 3,871,004 | 3/1975 | Rittberg | 346/75 |
| 4,314,282 | 2/1982 | Fischbeck | 358/286 |
| 4,322,063 | 3/1982 | Fischbeck | 267/160 |
| 4,349,828 | 9/1982 | Fischbeck | 346/1.1 |

*Primary Examiner*—Joseph W. Hartary
*Attorney, Agent, or Firm*—Richard A. Tomlin

[57] ABSTRACT

An oscillating bar drop-on-demand ink jet printer is used to print on a continuously moving record-receiving surface. The record-receiving surface moves in a direction orthogonal to the direction of oscillation of the oscillating bar, the resultant trace being a sine wave. Electrostatic deflection is utilized to square off the sine wave to a preferred rectangular trace.

2 Claims, 5 Drawing Figures

INK JET PRINTING

The invention relates to an oscillating bar drop-on-demand ink jet printer where printing occurs on a continuously moving record-receiving surface.

Where an oscillating printer is used in combination with a continuously moving record-receiving surface, the record-receiving surface moving orthogonal to the direction of printer oscillation, the resultant trace of an ink jet with respect to the record-receiving surface is a sine wave. This decreases the effective printing time available to the printer since at either extreme of the oscillation, the trace is offset considerably from the preferred straight line scan, which provides the most complete coverage of the record surface and linearity of the printed image.

The present invention utilizes electrostatic deflection of the droplets to "square off" the sinusoidal trace, improving image quality and printing rate.

The foregoing advantages and features of the present invention will be apparent upon consideration of the following description of the invention, particularly when taken in conjunction with the following drawing wherein.

Figure 1:
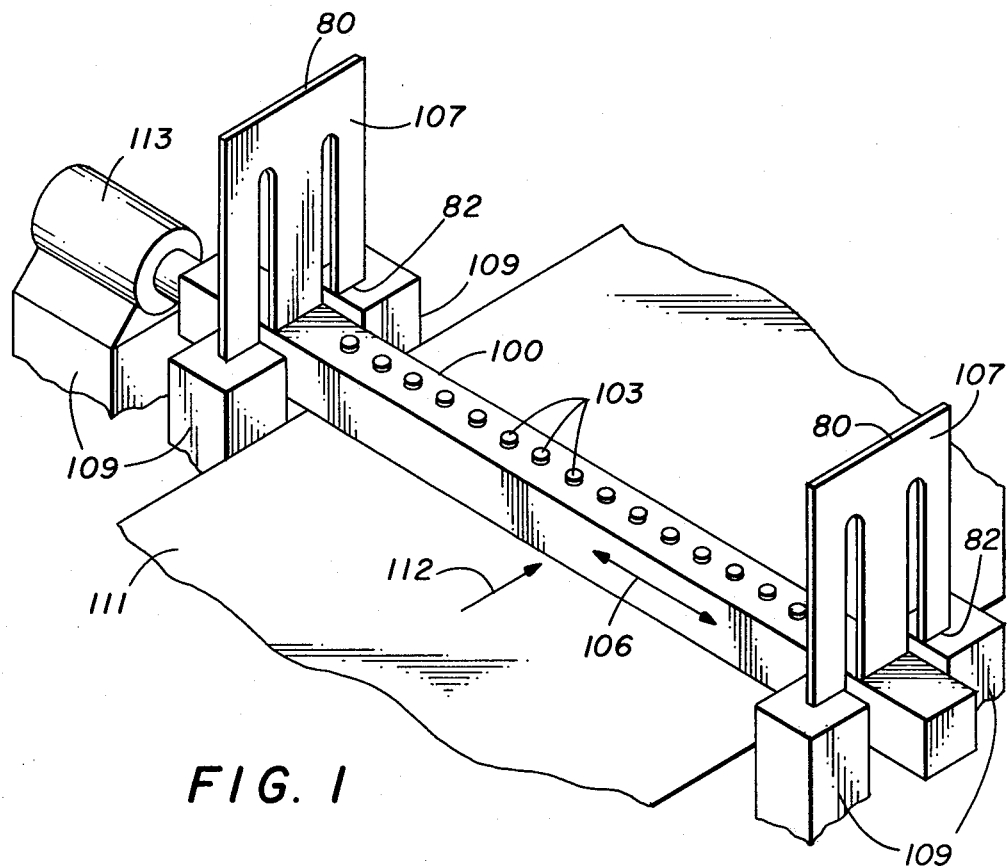
FIG. 1 is a perspective view of an oscillating bar printer in which the present invention is useful.

Referring now to FIG. 1, there is shown an oscillating bar marking device, which will be referred to hereinafter as a printer although it is understood that this device may be used as a printer, a copier or with the addition of suitable transmission means, a facsimile transceiver, as explained further below. Specifically, there is shown a raster input scan/raster output scan (RIS/ROS) support member 100, which may be, for example, of a plastic material. Supported by RIS/ROS member 100 are scanning/reading means 103 represented here by discs, which may be, by way of example, photodetectors. These reading means would not be required if the marking device were not being used as a copier or facsimile transceiver. Also supported by RIS/ROS support member 100 are marking elements 105 (see FIG. 2), which, in this exemplary instance, are drop-on-demand ink jets. Conveniently, one marking element 105 can be provided for each reading element 103; however, this is not necessary. RIS/ROS support member 100 is suspended for oscillatory movement in the axial direction 106 shown by the arrow from flexure mounts 107, which act as multiple compounded cantilever springs. That is, not only does the support member 100 pivot around edge 80, but edge 80 pivots around edge 82. This double pivoting action keeps RIS/ROS support member 100 in spaced relationship to record-receiving member 111 with a minimum amount of swing or arc over its complete travel. RIS/ROS support member 100 is oscillated by oscillating means 113, which may be, for example, a solenoid. Solenoid 113 is also fixed to base 109 as are flexure mounts 107. Another advantage of flexure mounts 107 is that very little power is required by solenoid 113 as in the preferred mode RIS/ROS support member 100 is oscillated at the natural harmonic frequency of flexure mounts 107.

Figure 2:
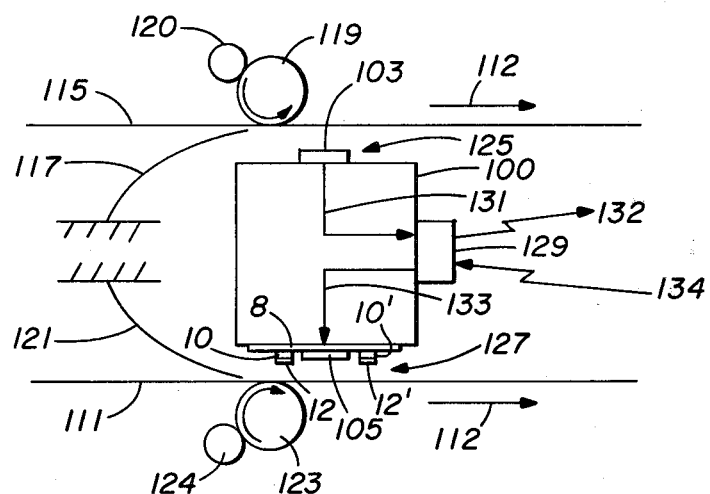
FIG. 2 is a side schematic view of the oscillating bar marking device of FIG. 1.

Referring now to FIG. 2, which is a schematic side view of the oscillating bar printer of FIG. 1 with the base 109 and flexure mounts 107 not shown. Document 115, which is to be scanned by photodetectors 103, is guided by leaf-spring fingers 117 into contact with drive guide roller means 119, which, when driven by motor means 120, pulls document 115 across the reading path of reading means 103, through image-reading station designated generally as 125. Document 115 and roller 119 were not shown in FIG. 1 to simplify understanding of the construction of the oscillating bar printer. Leaf-spring fingers 121 are used to guide record-receiving member 111, which may be, for example, paper, into contact with drive guide roller 123. Roller 123 driven by motor 124 guides and pulls record-receiving member 111 through the image-marking station designated generally as 127. Controller 129 is used to receive the input signal 131 from the reading means 103 and to produce an output signal 133 to ink jets 105. Controller 129 is conveniently mounted on oscillating RIS/ROS support member 100.

Where the oscillating bar printer is used as a copier, a document 115 to be copied and a copy sheet 111 are fed into the nips formed by leaf-spring fingers 117 and drive roller 119 and leaf-spring fingers 121 and drive roller 123, respectively. Solenoid 113 is activated causing RIS/ROS support member 100 to vibrate or oscillate axially a distance approximately equal to the distance between reading means 103 to ensure that all areas of document 115 are read or scanned. Drive roller motors 120 and 124 are activated causing rotation of rollers 119 and 123 in such manner that document 115 and record-receiving member 111 are advanced at about the same speed or in synchronization. That is, the document and copy may be advanced together either continuously or stepwise. Preferably, the document 115 and copy sheet 111 are moved continuously because less expensive drive means and less circuitry are required than for stepwise movement. It can be seen then that, where RIS/ROS support member 100 is oscillated from side to side, and copy sheet 111 is moved continuously at right angles thereto, the resultant trace is a sine wave. As document 115 is advanced, it is scanned by reading means 103, which sends signals 131 to controller 129. Controller 129, in response to input signals 131, provides output signals 133, which trigger the appropriate ink jets 105. In this manner, a copy is formed on sheet 111 corresponding to the document 115. Obviously, signals 134 could be provided from a remote source, for example, facsimile or computer devices, in which case reading means 103, document 115 and associated document feed apparatus would not be activated or required. Similarly, signals 132 could be transmitted to a remote source.

Also provided on RIS/ROS support member 100 are faceplate electrode 8 and ink droplet deflector electrodes 12 and 12', which are supported on electrically insulating pads 10 and 10', respectively. The operation of these elements is described below.

Figure 3:
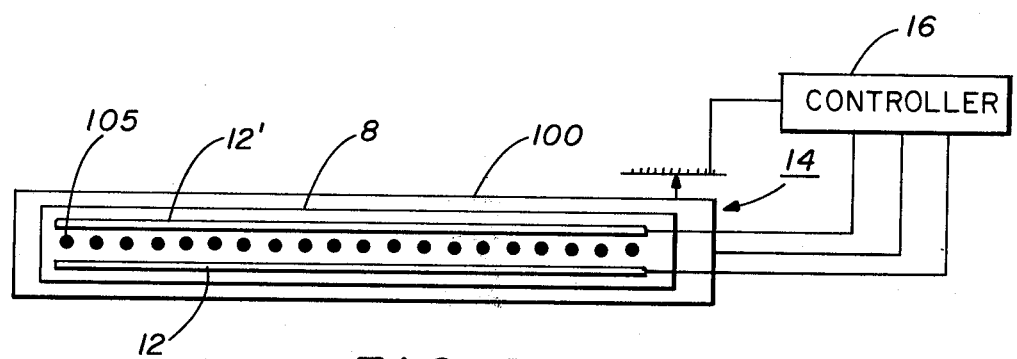
FIG. 3 is an enlarged view of the ink jet face of the oscillating bar of the printer of FIG. 1 showing the electrostatic deflection means.

Referring now to FIG. 3, there is shown the ink jet supporting surface of RIS/ROS support member 100. On the surface of RIS/ROS support member 100 is formed electrode 8. This electrode, in combination with either electrode 12 or 12', provides the Y direction deflection; that is, droplets are deflected in a direction orthogonal to the axis 106 of oscillation of RIS/ROS support member 100. A linear encoder generally designated 14 is used to sense the direction of movement and location of RIS/ROS support member 100 during its oscillation. The encoder signal is fed to electrode controller 16.

Referring now to FIG. 5, there is shown trace 20, which represents the resultant trace of the Y direction movement of copy sheet 111 superimposed on the X direction oscillation of any one of ink jets 105. It is desired to have the droplets form a line of print 22 to provide a linear final image. It is accordingly necessary to have the ink droplets deflected a distance represented by, for example, increments $\Delta Y$ and $\Delta Y'$. This is accomplished by applying a suitable potential difference between electrodes 12 or 12' and the surface electrode 8.

Figure 4A:
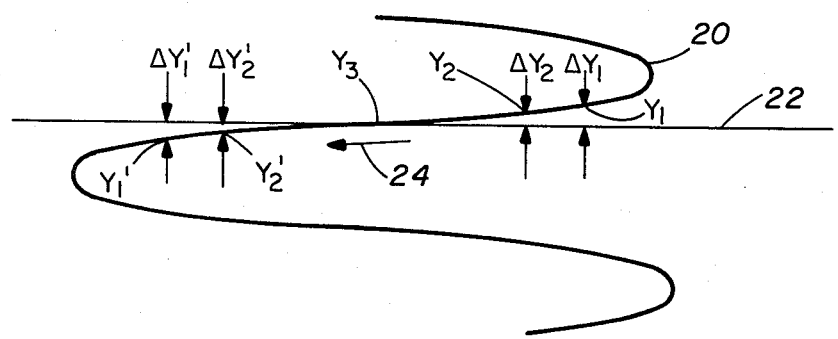
FIGS. 4A and 4B show the sinusoidal trace which results from the motion of the oscillating bar being superimposed on the motion of the continuously moving record-receiving surface and the correction desired through the use of electrostatic deflection.
Figure 4B:
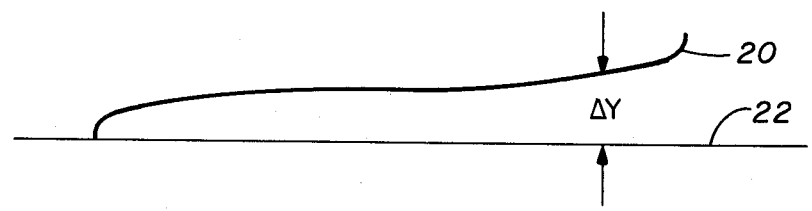

In operation sensor 14 senses in what direction the RIS/ROS support member 100 is moving, and where the RIS/ROS support member is positioned in respect to its oscillation. In FIG. 4A, for example, assume the RIS/ROS support member 100 is moving in a direction from right to left, as shown by arrow 24. When the sensor 14 detects that the ink jets are at location $Y_1$, the electrode controller 16 is preprogrammed to apply a potential difference between deflection electrode 12 and surface electrode 8 of a magnitude sufficient to deflect the droplet a distance $\Delta Y_1$. Similarly at $Y_2$, deflection of the droplet a distance of $\Delta Y_2$ is required. Where the trace crosses the desired line of print 22 at point $Y_3$, deflection is not required. Where the trace 20 again moves significantly away from line of print 22 but in the opposite direction, electrode 12' is activated to provide corrections $\Delta Y'_2$ and $\Delta Y'_1$. It is of course not necessary to have two deflection electrodes as can be understood by reference to FIG. 4B. Although simpler in construction, more power is required to move the droplet distance $\Delta Y$ in FIG. 4B than for the similar RIS/ROS support member position distance $\Delta Y_1$ in FIG. 4A.

Although specific components have been disclosed herein, many modifications and variations will occur to those skilled in the art. Such modifications and variations are intended to be included within the scope of the appended claims.

What is claimed is:

1. A method of drop-on-demand ink jet printing comprising:
   (a) providing a drop-on-demand ink jet for expelling ink droplets;
   (b) oscillating said drop-on-demand ink jet in a first direction while simultaneously moving a record-receiving member continuously and in a direction orthogonal to the direction of oscillation of the ink jet, the record-receiving member being in a location to receive ink droplets expelled from the ink jet;
   (c) expelling ink droplets from said ink jet; and
   (d) electrostatically deflecting at least a portion of said ink droplets in a direction orthogonal to the direction of oscillation of said ink jet an amount sufficient to at least partially square off the trace of ink droplets impacting on the record-receiving surface.

2. The method of ink jet printing wherein at least two drop-on-demand ink jets are provided on a bar, said ink jets being aligned parallel to an axis of said bar;
   (a) oscillating said bar in a direction parallel to said axis;
   (b) ejecting droplets in response to a predetermined signal corresponding to an image to be produced;
   (c) determining the position and direction of movement of said oscillating bar at least at each position a droplet is ejected; and
   (d) electrostatically deflecting at least a portion of said droplets toward a print line on a record-receiving member, said print line being parallel to said axis of said oscillating bar.

* * * * *